O. S. Backus,
Coating Metals.

No. 102,078.  Patented Apr. 19, 1870.

Witnesses:
Harry King.
C. L. Evert

Inventor:
O. S. Backus
per
Alexander Mason
Attys.

United States Patent Office.

QUIMBY S. BACKUS, OF WINCHENDON, MASSACHUSETTS.

Letters Patent No. 102,078, dated April 19, 1870.

IMPROVED PROCESS FOR FACING VALVES AND VALVE-SEATS FOR STEAM-ENGINES.

The Schedule referred to in these Letters Patent and making part of the same.

*To all whom it may concern:*

Be it known that I, QUIMBY S. BACKUS, of Winchendon, in the county of Worcester and in the State of Massachusetts, have invented certain new and useful improvements in Process for Facing Valves and Valve-seats for Steam-Engines; and do hereby declare that the following is full, clear, and exact description thereof, reference being had to the accompanying drawings and to the letters of reference marked thereon, making a part of this specification.

The nature of my invention consists in facing the valve-seats and valves of steam-engines with steel welded to the iron in the mold when the casting is made, and afterward planed, hardened, and ground or polished to a bearing.

In order to enable others skilled in the art to which my invention appertains to make and use the same, I will now proceed to describe the manner in which the same is performed, referring to the annexed drawings, in which—

Figure 1:
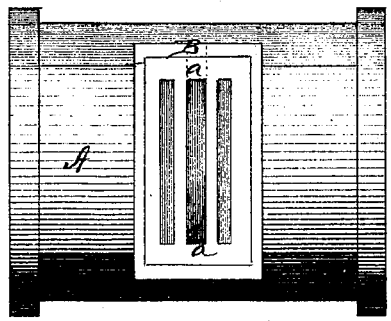
Figure 1 is a side view of a cylinder with valve-seat.
Figure 2:
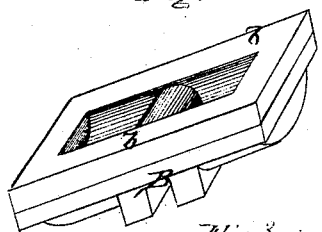
Figure 2 is a perspective view of the valve.
Figure 3:
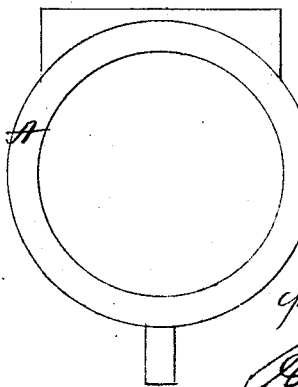
Figure 3 is an end view of the cylinder.

A represents the cylinder provided with valve-seat B, faced with steel, *a*; said steel facing being imbedded in the iron.

C is the valve, also faced with a steel lining, *b*.

The valve C and valve-seat B are faced with steel in the following manner:

In the first place, I prepare my steel and form it to the shape required, then place the steel in the mold made by the pattern for the cylinder, valve-seat, or valve, and pour on the melted cast-iron and allow it to pass over the surface of the steel till the steel becomes sufficiently soft to weld. I then allow the mold to fill with the welded cast-iron. By this process the steel becomes firmly welded to the cast-iron. I then plane, harden, and finish the steel surface of the valve and the steel surface of the valve-seat.

By thus welding the steel to the iron, I can heat the steel to harden it, and grind the surface true and even without danger of springing the steel, or of its becoming loose or detached from the iron when in use.

The advantages of using the two hardened steel surfaces in contact, instead of two cast-iron surfaces, will be readily perceived. The hardened steel surfaces will wear longer and more evenly, requiring to be trued or worked down to a true surface much less frequently; there will be less friction between them, thus reducing the amount of power required to move the valve, and effecting a great saving of power.

This method of welding the steel to the iron in the mold, while the iron is in a liquid state, is the only one by which the steel can be securely fastened to the iron, so that it cannot spring in hardening, or work loose in service; as, if it be fastened to the iron by means of pins, screws, or other devices of like nature, it either springs or warps in hardening, or becomes loose or detached in use.

Having thus fully described my invention,

What I claim as new, and desire to secure by Letters Patent, is—

1. The method herein described of facing valves and valve-seats for steam-engines, with steel welded to the iron in the mold while the iron is in a liquid state, substantially as herein set forth.

2. A valve faced with steel in the manner and for the purposes herein set forth.

3. A valve-seat faced with steel in the manner and for the purposes herein set forth.

In testimony that I claim the foregoing, I have hereunto set my hand this 22d day of May, 1869.

Q. S. BACKUS.

Witnesses:
A. N. MARR,
C. L. EVERT.